(12) United States Patent
Phillips et al.

(10) Patent No.: US 11,851,245 B1
(45) Date of Patent: Dec. 26, 2023

(54) STUFFED STOCKING SYSTEM AND METHOD

(71) Applicants: Alex Wittmann Phillips, Mukilteo, WA (US); Karen Jody Mahood, Mukilteo, WA (US)

(72) Inventors: Alex Wittmann Phillips, Mukilteo, WA (US); Karen Jody Mahood, Mukilteo, WA (US)

( * ) Notice: Subject to any disclaimer, the term of this patent is extended or adjusted under 35 U.S.C. 154(b) by 276 days.

(21) Appl. No.: 17/362,381

(22) Filed: Jun. 29, 2021

Related U.S. Application Data

(60) Provisional application No. 63/049,469, filed on Jul. 8, 2020.

(51) Int. Cl.
| | | |
|---|---|---|
| B65D 71/00 | (2006.01) | |
| B65D 33/25 | (2006.01) | |
| B65D 33/00 | (2006.01) | |
| B65D 33/10 | (2006.01) | |
| A47G 33/00 | (2006.01) | |
| B65D 33/14 | (2006.01) | |
| G06F 3/14 | (2006.01) | |

(52) U.S. Cl.
CPC ......... *B65D 33/2541* (2013.01); *A47G 33/00* (2013.01); *B65D 33/004* (2013.01); *B65D 33/105* (2013.01); *B65D 33/14* (2013.01); *B65D 2203/02* (2013.01); *G06F 3/14* (2013.01)

(58) Field of Classification Search
CPC ........................ B65D 33/2541; B65D 33/004; B65D 33/105; B65D 33/14; B65D 2203/02; A47G 33/00; G06F 3/14
See application file for complete search history.

(56) References Cited

U.S. PATENT DOCUMENTS

2021/0137230 A1 * 5/2021 Lund .................... A45C 13/001

FOREIGN PATENT DOCUMENTS

| AU | 2010203012 A1 * | 2/2011 | ............ A45C 11/00 |
| CN | 201115590 Y * | 9/2008 | |

* cited by examiner

*Primary Examiner* — An T Nguyen
(74) *Attorney, Agent, or Firm* — Fresh IP PLC; John R. Bednarz

(57) ABSTRACT

An apparatus includes a receptacle configured to hold contents in a defined cavity, a device configured to fasten and secure the contents within the receptacle, and a tag configured to attach from a first attachment point on the receptacle to a second attachment point on the receptacle after the contents are placed within the receptacle.

15 Claims, 7 Drawing Sheets

STUFFED STOCKING SYSTEM AND METHOD

CROSS-REFERENCE TO RELATED APPLICATION

This application claims priority under 35 U.S.C. § 119 to U.S. Patent Application No. 63/049,469 filed Jul. 8, 2020, entitled "Stuffed Stocking System and Method," the entire contents of which are incorporated herein by reference.

BACKGROUND

It is a common holiday tradition to receive gifts and presents in a stocking from family, friends, and even Santa Claus. Unfortunately, families may be unable to gather in person to share gifts and presents at the holiday times for a number of reasons including illness or distance between family members. As an example, in 2020, people throughout the United States and much of the world have been practicing social distancing because of the novel coronavirus that causes coronavirus disease 2019 (COVID-19). Many families have been unable to see each other in person since the worldwide pandemic began in early 2020. Thus, for a number of reasons, people may not be able to share in the spirit and experience of watching others open their presents.

It is with these issues in mind, among others, that various aspects of the disclosure were conceived.

SUMMARY

According to one aspect, a stuffed stocking system includes a receptacle configured to hold contents in a defined cavity, a device configured to fasten and secure the contents within the receptacle, and a tag configured to attach from a first attachment point on the receptacle to a second attachment point on the receptacle after the contents are placed within the receptacle.

According to another aspect, a method includes a first person such as a gift giver that may insert contents into a Christmas stocking for a recipient. Next, the recipient of the Christmas stocking may begin to open a zipper using a zipper pull to view contents within the stocking. Next, a remote viewing event may begin to transmit information associated with an opening of the Christmas stocking from a first computing device to a second computing device. The first computing device may be associated with the recipient and the second computing device may be associated with a gifter of the stocking.

According to another aspect, a holiday stocking may include a receptacle configured to hold contents in a defined cavity, a zipper sewn to a first end of the receptacle and configured to fasten and secure the contents within the receptacle, a handle sewn to a longitudinal side of the receptacle, and a tag configured to attach from a first attachment point on the receptacle to a second attachment point on the receptacle after the contents are placed within the receptacle, the tag comprising a message to a recipient of the receptacle, the message indicating a time to open the receptacle, the first attachment point comprising a zipper pull associated with the zipper, and the second attachment point comprising a hanging loop to hang the apparatus, the tag securing the zipper pull to the hanging loop after the contents are placed in the receptacle.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Aspects of a stuffed stocking system and method includes a holiday or Christmas stocking and a zippered stocking or a stocking with an enclosure device or mechanism that may allow the stocking to be shipped or transported after being filled with contents. The stocking may be secured with a gift tag that may be attached from a first attachment point to a second attachment point. The gift tag may be removed from either the first attachment point and the second attachment point at a particular time such as a remote viewing event, video call, or broadcast associated with an opening of the stocking by a recipient.

As an example, the stuffed stocking system may include a receptacle configured to hold contents in a defined cavity, a device configured to fasten and secure the contents within the receptacle, and a tag configured to attach from a first attachment point on the receptacle to a second attachment point on the receptacle after the contents are placed within the receptacle.

In addition, the tag may have one or more messages to a recipient of the receptacle. The one or more messages may indicate a time to open the receptacle. The stuffed stocking system may be a Christmas stocking. The device configured to fasten the receptacle may include a zipper sewn into the receptacle. Additionally, the stuffed stocking system may have a handle sewn to a longitudinal side of the receptacle.

The device configured to fasten the receptacle may include a zipper, the first attachment point may include a zipper pull associated with the zipper, and the second attachment point may include a hanging loop to hang the apparatus. The tag may be secured from the zipper pull to the hanging loop after the contents are placed in the receptacle. In a further example, the zipper is sewn in a first end of the receptacle. In one example, the recipient may unsecure the tag from one of the zipper pull and the hanging loop and a remote viewing event for an opening of the receptacle may begin.

As an example, the stuffed stocking system may include a first computing device to transmit information associated with the remote viewing event to a second computing device, the information including at least one of video, audio, and data. The second computing device may receive the information associated with the remote viewing event and display the information on a display.

Figure 1:
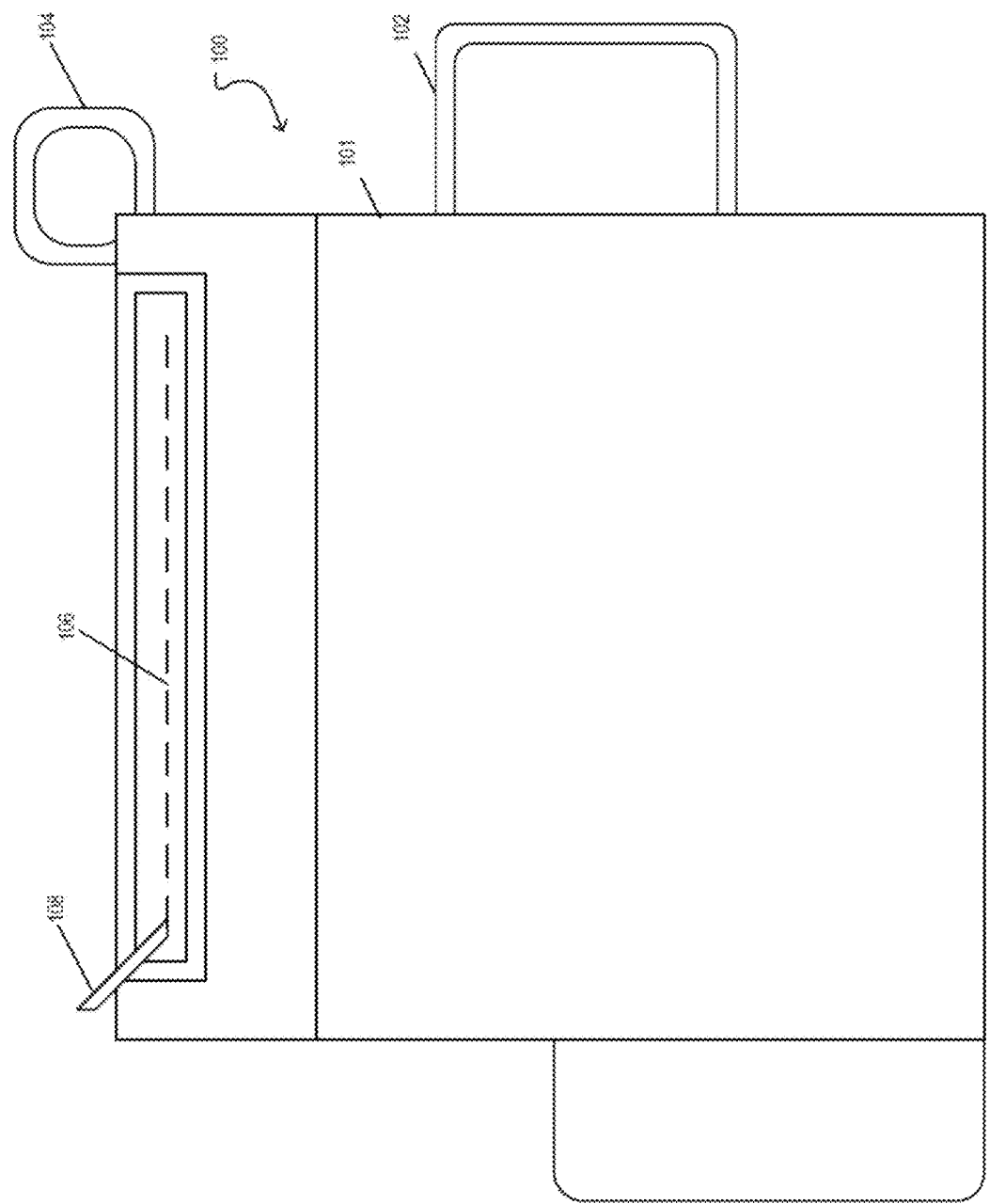
FIG. 1 shows a front view of a stuffed stocking system according to an example embodiment.

FIG. 1 shows a front view of a stuffed stocking system 100 according to an example embodiment. The stuffed stocking system 100 comprises a holiday or Christmas stocking 101 having a generally stocking-type shape with a hollow portion to store contents therein or another type of shape, a handle 102, a hanging loop 104, a zipper or stocking enclosure device 106, and a zipper pull 108 to open the zipper or stocking enclosure device 106 in response to a pull or another force by a user.

The handle 102 may be used by a person to carry the stocking 101. The zipper 106 may be a device such as two flexible strips of metal or plastic having interlocking projections that may be closed or opened by pulling the zipper pull 108 associated with the interlocking projections. The zipper 106 may be similar to other fastening devices that may be used to fasten garments, bags, and other items. The Christmas stocking 101 may be a bag or pouch that may secure contents within when the zipper 106 is in a closed state. The bag or pouch may be a cavity within the Christmas stocking to hold and secure the contents. The contents may be accessed when the zipper is in an open state. The remote viewing event may be any call, video, chat, video call, video chat, video recording, or other means of electronically transmitting video, audio, and other data via a network.

As shown in FIG. 1, the Christmas stocking 101 may have the zipper 106 on a top or one end of the Christmas stocking to secure contents within the Christmas stocking and the handle 102 along one of the longitudinal sides of the Christmas stocking to allow for carrying of the Christmas stocking. The zipper 106 may be configured to open and/or close toward the hanging loop 104. This may allow the zipper 106 to be secured with the hanging loop 104 and may serve to warn a recipient of the Christmas stocking to not open the stocking until a certain date, e.g. Christmas day or birthday. The Christmas stocking 101 may be configured to be stuffed or filled, shipped from a first location to a second location, transported from the first location to the second location, and may be configured to allow remote viewing of an opening of the Christmas stocking by persons such as relatives and/or friends.

Figure 2:
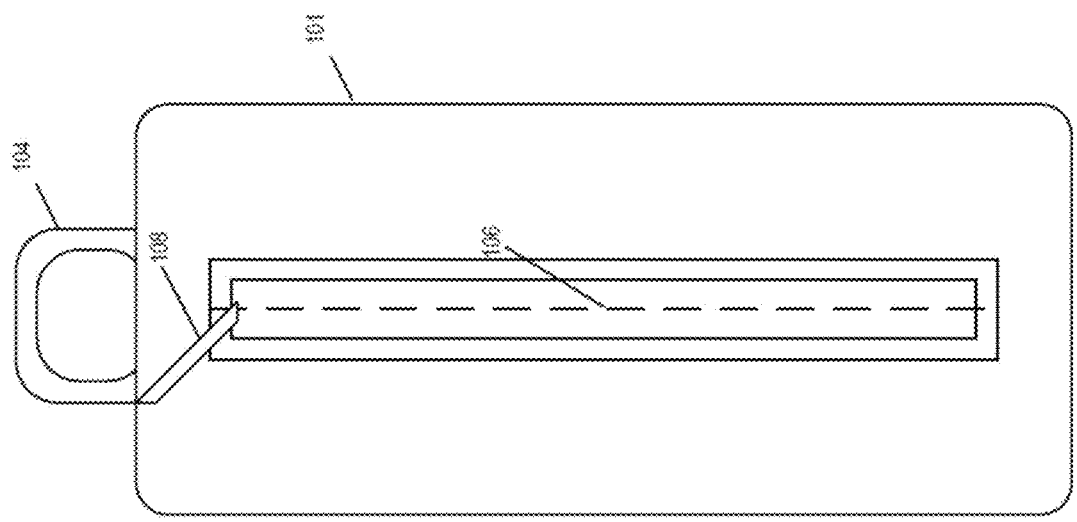
FIG. 2 shows a top view of the stuffed stocking system according to an example embodiment.

FIG. 2 shows a top view of the stuffed stocking system 100 according to an example embodiment. FIG. 2 shows a view of the top of the Christmas stocking 101, the zipper 106, and the hanging loop 104.

Figure 3:
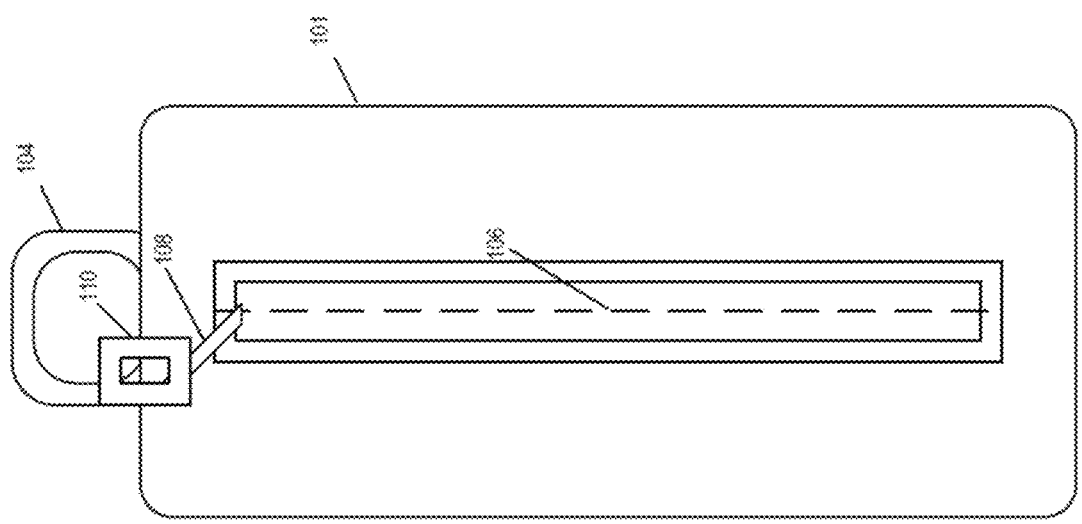
FIG. 3 shows another view of the stuffed stocking system according to an example embodiment.

FIG. 3 shows another view of the stuffed stocking system 100 according to an example embodiment. FIG. 3 shows another view of the top of the Christmas stocking 101, the zipper 106, the hanging loop 104, and an optional gift tag 110 that may be used to secure the zipper pull 108 to the hanging loop 104. The gift tag 110 may be a label, marker, alert, or another system that may be used to fasten the zipper pull 108 to the hanging loop 104, the zipper 106, and/or the Christmas stocking 101.

Figure 4:
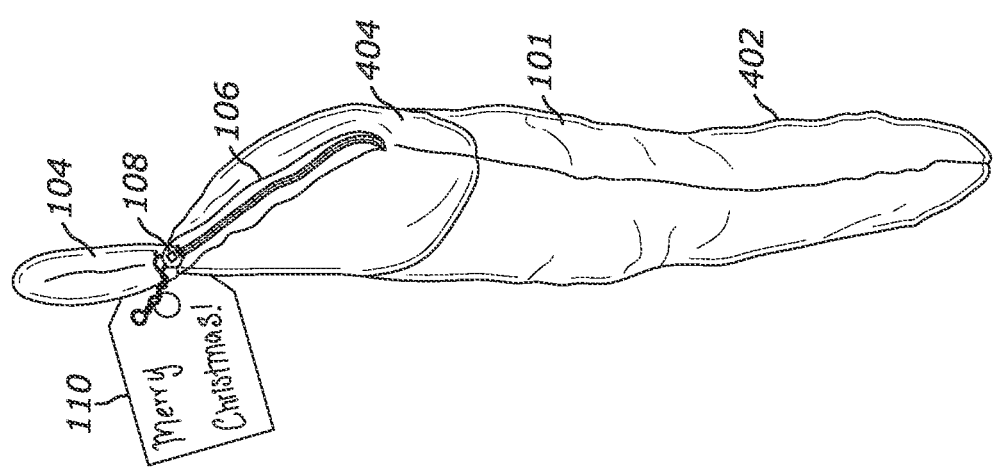
FIG. 4 shows a photograph view of the stuffed stocking system according to an example embodiment.

FIG. 4 shows a photograph view of the stuffed stocking system 100 according to an example embodiment. In one example, the Christmas stocking 101 may have a first portion 402 that is a first particular color such as red. In addition, the Christmas stocking 101 may have a second portion 404 near a top that is a second particular color such as white. The hanging loop 104 may be the first particular color or another color. Other colors are possible. As shown in FIG. 4, the gift tag 110 may include a message such as "Merry Christmas!".

The stuffed stocking system 100 may be associated with a computing device that includes at least one processor to process data and memory to store data. The computing device may be used during the remote viewing event. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the at least one computing device further includes at least one communications interface to transmit and receive communications, messages, and/or signals.

The at least one computing device can be a laptop computer, a smartphone, a personal digital assistant, a tablet computer, a standard personal computer, or another processing device. The at least one computing device may include a display, such as a computer monitor, for displaying data and/or graphical user interfaces. The at least one computing device may also include a Global Positioning System (GPS) hardware device for determining a particular location of the computing device, an input device, such as a camera, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer. The at least one computing device may be sewn into the first portion 402 and/or the second portion 404.

The at least one computing device may display on the display a graphical user interface (or GUI) to generate a graphical user interface on the display. The graphical user interface may be provided by an application. The graphical user interface enables a user of the at least one computing device to interact with the application.

The application may be a component of an application and/or service executable by the at least one computing device. For example, the application may be a single unit of deployable executable code or a plurality of units of deployable executable code. According to one aspect, the application may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

As an example, the stuffed stocking system may be a Zippered bag or pouch with Gift tag comprising:
a. A Zippered bag or pouch, and
b. A Gift tag intended to secure the Zipper pull to another attachment point on the Zippered bag or pouch to keep the Zipper closed after contents have been placed inside the Zippered bag or pouch.

As another example, the stuffed stocking system may be a Zippered bag or pouch with message securing gift tag comprising:
a. A Zippered bag or pouch, and
b. A Gift tag intended to secure the Zipper pull to another attachment point on the Zippered bag or pouch to keep the Zipper closed after contents have been placed inside the Zippered bag or pouch, which includes a message to the recipient of the Zippered bag or pouch informing the recipient of the Zippered bag or pouch not to open until a Remote viewing event is happening.

As another example, the stuffed stocking system may be a Zippered Christmas stocking comprising:
  a. A Christmas stocking, and
  b. A Zipper sewn into the opening of the Christmas stocking which temporarily encloses the contents of the Christmas stocking.

As another example, the stuffed stocking system may be a Zippered handled Christmas stocking comprising:
  a. A Christmas stocking,
  b. A Zipper sewn into the opening of the Christmas stocking which temporarily encloses the contents of the Christmas stocking, and
  c. A Handle sewn into the long edge of the Christmas stocking.

As another example, the stuffed stocking system may be a Zippered Christmas stocking with securing gift tag comprising:
  a. A Christmas stocking,
  b. A Zipper sewn into the opening of the Christmas stocking which temporarily encloses the contents of the Christmas stocking and when closed brings the zipper pull and hanging loop together such that they can be tightly tied together.
  c. A gift tag intended to secure the Zipper pull to the hanging loop on the Christmas stocking to keep the Zipper closed after contents have been placed inside the Christmas stocking.

As another example, the stuffed stocking system may be a Zippered Christmas stocking with message securing gift tag comprising:
  a. A Christmas stocking,
  b. A Zipper sewn into the opening of the Christmas stocking which temporarily encloses the contents of the Christmas stocking and when closed brings the zipper pull and hanging loop together such that they can be tightly tied together.
  c. A gift tag intended to secure the Zipper pull to another attachment point on the Zippered bag or pouch to keep the Zipper closed after contents have been placed inside the Zippered bag or pouch, which includes a message to the recipient of the Zippered bag informing the recipient of the Zippered bag not to open until a Remote viewing event is happening.

As another example, the stuffed stocking system may be a Zippered handled Christmas stocking with securing gift tag comprising:
  a. A Christmas stocking,
  b. A Handle sewn into the long edge of the Christmas stocking,
  c. A Zipper sewn into the opening of the Christmas stocking which temporarily encloses the contents of the Christmas stocking and when closed brings the zipper pull and hanging loop together such that they can be tightly tied together.
  d. A gift tag intended to secure the Zipper pull to the hanging loop on the Christmas stocking to keep the Zipper closed after contents have been placed inside the Christmas stocking.

As another example, the stuffed stocking system may be a Zippered handled Christmas stocking with message securing gift tag comprising:
  a. A Christmas stocking,
  b. A Handle sewn into the long edge of the Christmas stocking,
  c. A Zipper sewn into the opening of the Christmas stocking which temporarily encloses the contents of the Christmas stocking and when closed brings the zipper pull and hanging loop together such that they can be tightly tied together, and
  d. A gift tag intended to secure the Zipper pull to another attachment point on the hanging loop to keep the Zipper closed after contents have been placed inside the Christmas stocking, which includes a message to the recipient of the Zippered bag informing the recipient of the Zippered bag not to open until a Remote viewing event is happening.

Figure 5:
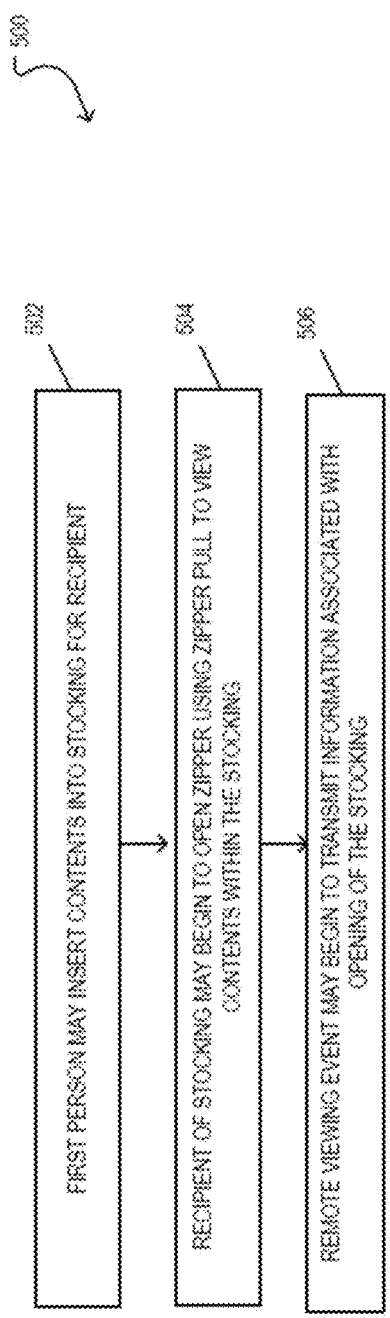
FIG. 5 illustrates a flowchart for using the stuffed stocking system according to an example embodiment.

FIG. 5 illustrates a flowchart of a process 500 for using the stuffed stocking system 100 according to an example embodiment. In step 502, a first person such as a gift giver or gifter may insert contents into the Christmas stocking 101 for a recipient. In step 504, the recipient of the Christmas stocking 101 may begin to open the zipper 106 using the zipper pull 108 to view contents within the stocking. In step 506, a remote viewing event may begin to transmit information associated with an opening of the Christmas stocking from a first computing device to a second computing device. The remote viewing event may be triggered by the zipper pull 108, the gift tag 110, or in other ways.

Figure 6:
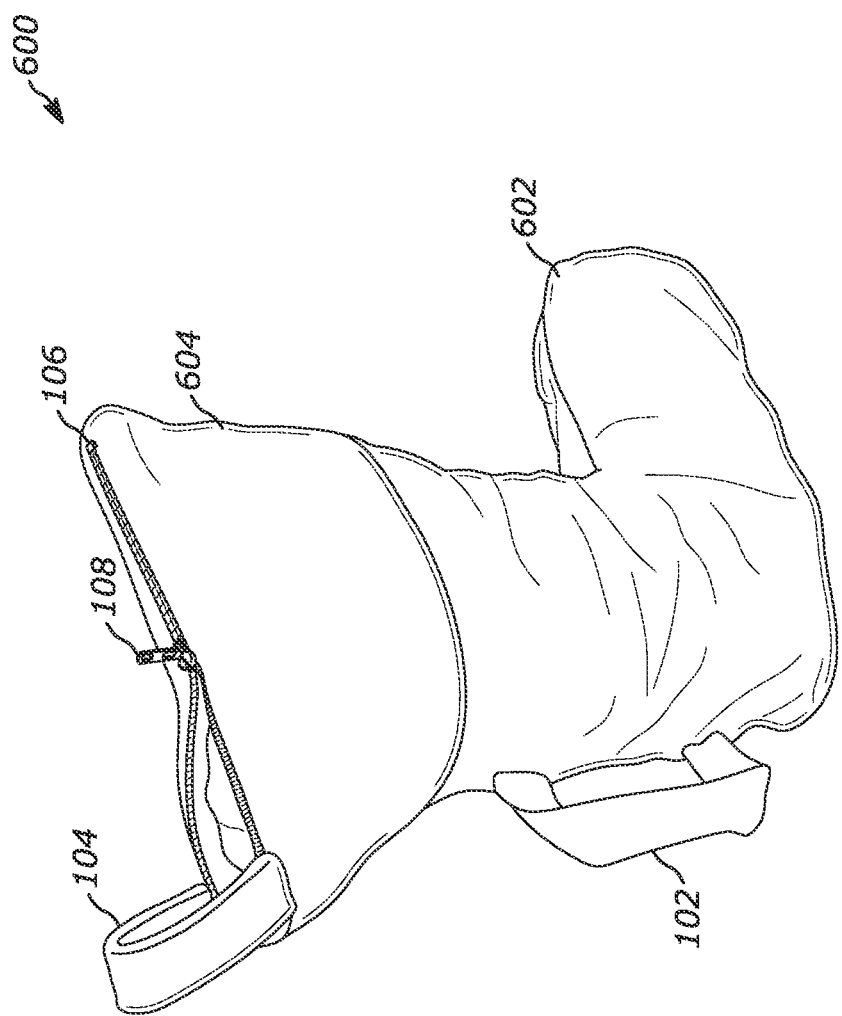
FIG. 6 illustrates another photograph view of the stuffed stocking system according to an example embodiment.

FIG. 6 shows another photograph view 600 of the stuffed stocking system 100 according to an example embodiment. As shown in FIG. 6, the Christmas stocking 101 may have a first portion 602 that is a first particular color such as red. In addition, the Christmas stocking 101 may have a second portion 604 near a top that is a second particular color such as white. The hanging loop 104 may be the first particular color or another color. The handle 102 is shown on a first side of the stuffed stocking system 100. As noted above, the computing device may be in the first portion 602 and/or the second portion 604 and may be sewn into the first portion 602 and/or the second portion 604.

As an example, the stuffed stocking system 100 may include a receptacle configured to hold contents in a defined cavity, a zipper sewn to a first end of the receptacle and configured to fasten and secure the contents within the receptacle, a handle sewn to a longitudinal side of the receptacle, and a tag configured to attach from a first attachment point on the receptacle to a second attachment point on the receptacle after the contents are placed within the receptacle, the tag comprising a message to a recipient of the receptacle, the message indicating a time to open the receptacle, the first attachment point comprising a zipper pull associated with the zipper, and the second attachment point comprising a hanging loop to hang the apparatus, the tag securing the zipper pull to the hanging loop after the contents are placed in the receptacle.

In another example, the recipient unsecures the tag from one of the zipper pull and the hanging loop and a remote viewing event for an opening of the receptacle begins. As noted above, the stuffed stocking system may include a first computing device to transmit information associated with the remote viewing event to a second computing device, the information comprising at least one of video, audio, and data. The second computing device may receive the information associated with the remote viewing event and display the information on a display.

As another example, the second computing device may receive the information associated with the remote viewing event and display the information on a display in realtime.

As another example, the computing device may be sewn into the receptacle, determine a current time, and compare the time to open with the receptacle with the current time.

The computing device may prevent the zipper from opening the receptacle based on the current time. Alternatively, the computing device may allow the zipper to open the receptacle when the current time is after the time to open the receptacle.

In another example, the computing device may be sewn into the receptacle, determine a pull of the zipper using input received by the computing device such as input received by an accelerometer of the computing device, and determine a current time and compare the time to open with the receptacle with the current time. The computing device may be a first computing device, and the first computing device may transmit information associated with a remote viewing event to a second computing device, the information comprising at least one of video, audio, and data for an opening of the receptacle.

Figure 7:
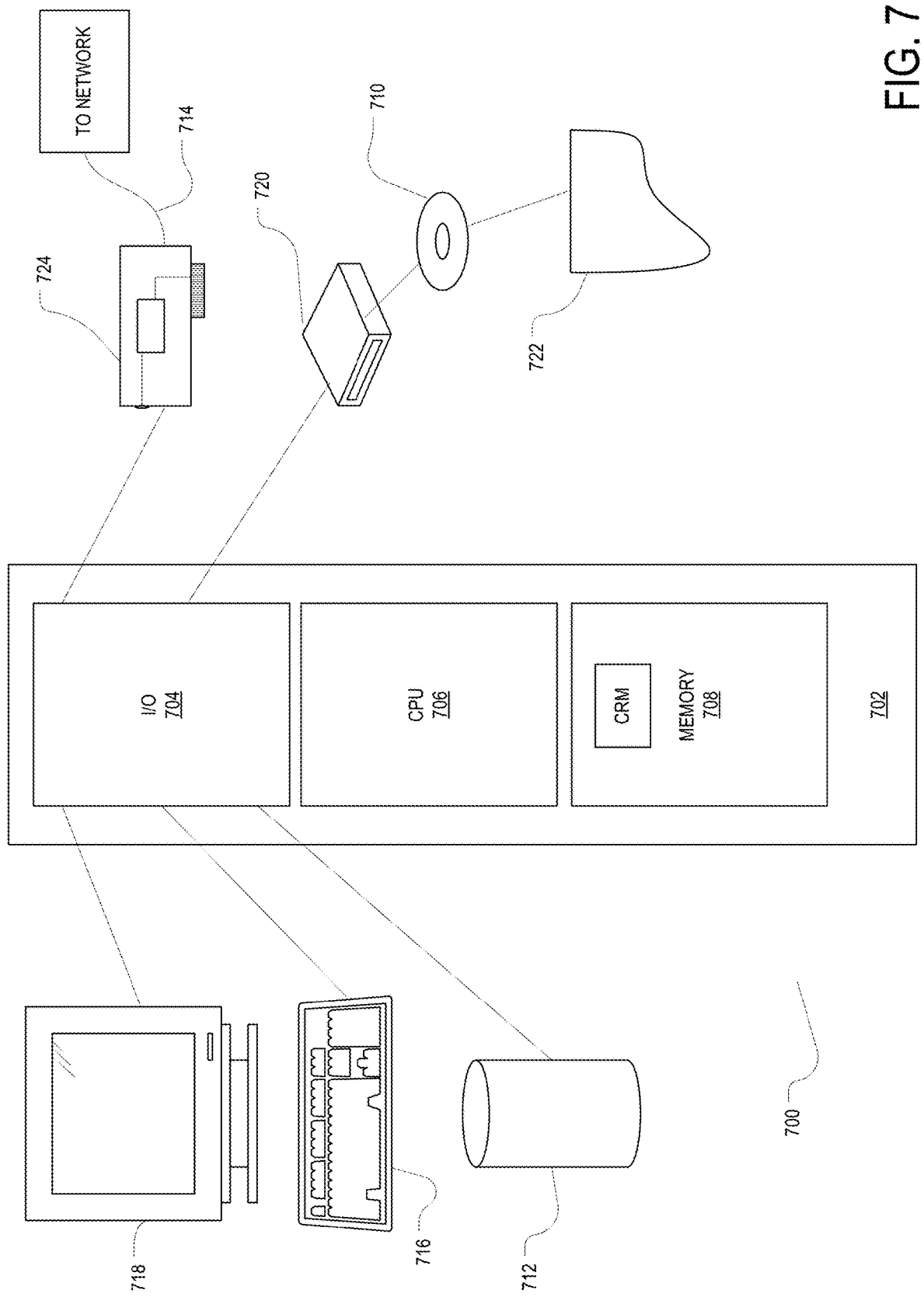
FIG. 7 illustrates a block diagram of a computing device according to an example embodiment.

FIG. 7 illustrates an example computing system 700 that may implement various systems, such as the stuffed stocking system 100, and the methods discussed herein, such as process 500. A general purpose computer system 700 is capable of executing a computer program product to execute a computer process. Data and program files may be input to the computer system 700, which reads the files and executes the programs therein. Some of the elements of a general purpose computer system 700 are shown in FIG. 7 wherein a processor 702 is shown having an input/output (I/O) section 704, a central processing unit (CPU) 706, and a memory section 708. There may be one or more processors 702, such that the processor 702 of the computer system 700 comprises a single central-processing unit 706, or a plurality of processing units, commonly referred to as a parallel processing environment. The computer system 700 may be a conventional computer, a server, a distributed computer, or any other type of computer, such as one or more external computers made available via a cloud computing architecture. The presently described technology is optionally implemented in software devices loaded in memory 708, stored on a configured DVD/CD-ROM 710 or storage unit 712, and/or communicated via a wired or wireless network link 714, thereby transforming the computer system 700 in FIG. 7 to a special purpose machine for implementing the described operations.

The memory section 708 may be volatile media, nonvolatile media, removable media, non-removable media, and/or other media or mediums that can be accessed by a general purpose or special purpose computing device. For example, the memory section 708 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 704 is connected to one or more user-interface devices (e.g., a keyboard 716 and a display unit 718), a disc storage unit 712, and a disc drive unit 720. Generally, the disc drive unit 720 is a DVD/CD-ROM drive unit capable of reading the DVD/CD-ROM medium 710, which typically contains programs and data 722. Computer program products containing mechanisms to effectuate the systems and methods in accordance with the presently described technology may reside in the memory section 704, on a disc storage unit 712, on the DVD/CD-ROM medium 710 of the computer system 700, or on external storage devices made available via a cloud computing architecture with such computer program products, including one or more database management products, web server products, application server products, and/or other additional software components. Alternatively, a disc drive unit 720 may be replaced or supplemented by another storage medium drive unit. The network adapter 724 is capable of connecting the computer system 700 to a network via the network link 714, through which the computer system can receive instructions and data. Examples of such systems include personal computers, Intel or PowerPC-based computing systems, AMD-based computing systems, ARM-based computing systems, and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 700 is connected (by wired connection and/or wirelessly) to a local network through the network interface or adapter 724, which is one type of communications device. When used in a WAN-networking environment, the computer system 700 typically includes a modem, a network adapter, or any other type of communications device for establishing communications over the wide area network. In a networked environment, program modules depicted relative to the computer system 700 or portions thereof, may be stored in a remote memory storage device. It is appreciated that the network connections shown are examples of communications devices for and other means of establishing a communications link between the computers may be used.

In an example implementation, source code executed by the computing device, a plurality of internal and external databases, source databases, and/or cached data on servers are stored in memory of the computing device, or other storage systems, such as the disk storage unit 712 or the DVD/CD-ROM medium 710, and/or other external storage devices made available and accessible via a network architecture. The source code executed by the computing device may be embodied by instructions stored on such storage systems and executed by the processor 702.

Some or all of the operations described herein may be performed by the processor 702, which is hardware. Further, local computing systems, remote data sources and/or services, and other associated logic represent firmware, hardware, and/or software configured to control operations of the stuffed stocking system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 702 and a user may interact with a Graphical User Interface (GUI) using one or more user-interface devices (e.g., the keyboard 716, the display unit 718, and the user devices 704) with some of the data in use directly coming from online sources and data stores. The system set forth in FIG.

7 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium, optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. An apparatus comprising:
   a receptacle configured to hold contents in a defined cavity;
   a zipper to fasten and secure the contents within the receptacle; and
   a tag configured to attach from a first attachment point on the receptacle to a second attachment point on the receptacle after the contents are placed within the receptacle, wherein
   the first attachment point comprises a zipper pull associated with the zipper, and the second attachment point comprises a hanging loop to hang the apparatus, the tag securing the zipper pull to the hanging loop after the contents are placed in the receptacle, the zipper is sewn in a first end of the receptacle, and the recipient unsecures the tag from one of the zipper pull and the hanging loop and a remote viewing event for an opening of the receptacle begins.

2. The apparatus of claim 1, wherein the tag comprises a message to a recipient of the receptacle, the message indicating a time to open the receptacle.

3. The apparatus of claim 1, wherein the apparatus comprises a Christmas stocking.

4. The apparatus of claim 1, further comprising a handle sewn to a longitudinal side of the receptacle.

5. The apparatus of claim 1, further comprising a first computing device to transmit information associated with the remote viewing event to a second computing device, the information comprising at least one of video, audio, and data.

6. The apparatus of claim 5, wherein the second computing device receives the information associated with the remote viewing event and displays the information on a display.

7. A holiday stocking, comprising:
   a receptacle configured to hold contents in a defined cavity;
   a zipper sewn to a first end of the receptacle and configured to fasten and secure the contents within the receptacle;
   a handle sewn to a longitudinal side of the receptacle; and
   a tag configured to attach from a first attachment point on the receptacle to a second attachment point on the receptacle after the contents are placed within the receptacle, the tag comprising a message to a recipient of the receptacle, the message indicating a time to open the receptacle, the first attachment point comprising a zipper pull associated with the zipper, and the second attachment point comprising a hanging loop to hang the apparatus, the tag securing the zipper pull to the hanging loop after the contents are placed in the receptacle, wherein
   the recipient unsecures the tag from one of the zipper pull and the hanging loop and a remote viewing event for an opening of the receptacle begins.

8. The holiday stocking of claim 7, further comprising a first computing device to transmit information associated with the remote viewing event to a second computing device, the information comprising at least one of video, audio, and data.

9. The holiday stocking of claim 8, wherein the second computing device receives the information associated with the remote viewing event and displays the information on a display.

10. The holiday stocking of claim 8, wherein the second computing device receives the information associated with the remote viewing event and displays the information on a display in realtime.

11. The holiday stocking of claim 7, wherein a computing device sewn into the receptacle determines a current time and compares the time to open the receptacle with the current time.

12. The holiday stocking of claim 11, wherein the computing device prevents the zipper from opening the receptacle based on the current time.

13. The holiday stocking of claim 11, wherein the computing device allows the zipper to open the receptacle when the current time is after the time to open the receptacle.

14. The holiday stocking of claim 7, wherein a computing device is sewn into the receptacle, determines a pull of the zipper using input received by the computing device, and determines a current time and compares the time to open the receptacle with the current time.

15. The holiday stocking of claim 14, wherein the computing device comprises a first computing device, and the first computing device transmits information associated with a remote viewing event to a second computing device, the information comprising at least one of video, audio, and data for an opening of the receptacle.

\* \* \* \* \*